(12) United States Patent
Burnette et al.

(10) Patent No.: US 11,438,272 B2
(45) Date of Patent: Sep. 6, 2022

(54) SYSTEM AND METHOD FOR MOBILITY TRACKING

(71) Applicant: Opanga Networks, Inc., Seattle, WA (US)

(72) Inventors: John Burnette, Seattle, WA (US); Ben Hadorn, Seattle, WA (US); Linh Nguyen, Seattle, WA (US); Dave Gibbons, Seattle, WA (US)

(73) Assignee: Opanga Networks, Inc., Bellevue, WA (US)

( * ) Notice: Subject to any disclaimer, the term of this patent is extended or adjusted under 35 U.S.C. 154(b) by 65 days.

(21) Appl. No.: 17/138,542

(22) Filed: Dec. 30, 2020

(65) Prior Publication Data
US 2021/0203558 A1 Jul. 1, 2021

Related U.S. Application Data

(60) Provisional application No. 62/956,135, filed on Dec. 31, 2019, provisional application No. 62/956,138, (Continued)

(51) Int. Cl.
*G06F 15/173* (2006.01)
*H04W 28/02* (2009.01)
(Continued)

(52) U.S. Cl.
CPC .............. *H04L 47/14* (2013.01); *H04L 41/12* (2013.01); *H04L 43/08* (2013.01); (Continued)

(58) Field of Classification Search
CPC ....... H04L 47/14; H04L 47/11; H04L 47/127; H04L 47/27; H04L 41/12; H04L 43/08; H04L 43/0876; H04L 43/16; H04L 63/1425; H04L 65/80; H04L 67/22; H04N 21/2402
See application file for complete search history.

(56) References Cited

U.S. PATENT DOCUMENTS

| 2017/0094454 A1* | 3/2017 | Pon | ...................... H04B 17/318 |
| 2021/0160720 A1* | 5/2021 | Chiang | ................. H04W 16/24 |

OTHER PUBLICATIONS

Neidhardt et al. ("Estimating Locations and Coverage Areas of Mobile Network Cells based on Crowdsourced Data", IFIP WMNC'2013, 8 pages) (Year: 2013).*

\* cited by examiner

*Primary Examiner* — Wing F Chan
*Assistant Examiner* — Joseph R Maniwang (57) ABSTRACT

Information regarding current conditions in a RAN or hybrid RAN/WAN are provided at fine geographic and temporal granularities (for example, on a per cell basis every second) using measurements and statistics produced in real time by monitoring a plurality of data sessions carried on the data plane of the network and tagging the measurements from the data sessions with a network location identifier (such as an identifier of a cell) associated with an endpoint of the data session. The information may include a profile for a shared channel (such as a cell) of the network, monitoring statistics for a portion of the network (such as a cell), or both. The information may have application in, for example, automatic network management (such as in congestion control), in automatic network diagnosis, and in network resource management and planning.

20 Claims, 3 Drawing Sheets

Related U.S. Application Data filed on Dec. 31, 2019, provisional application No. 62/956,104, filed on Dec. 31, 2019.

(51) Int. Cl.
*H04L 47/11* (2022.01)
*H04L 41/12* (2022.01)
*H04L 47/27* (2022.01)
*H04L 47/127* (2022.01)
*H04L 43/0876* (2022.01)
*H04L 67/50* (2022.01)
*H04L 43/08* (2022.01)
*H04L 43/16* (2022.01)
*H04L 9/40* (2022.01)
*H04L 65/80* (2022.01)
*H04N 21/24* (2011.01)

(52) U.S. Cl.
CPC .......... *H04L 43/0876* (2013.01); *H04L 43/16* (2013.01); *H04L 47/11* (2013.01); *H04L 47/127* (2013.01); *H04L 47/27* (2013.01); *H04L 63/1425* (2013.01); *H04L 65/80* (2013.01); *H04L 67/22* (2013.01); *H04N 21/2402* (2013.01)

SYSTEM AND METHOD FOR MOBILITY TRACKING

CROSS REFERENCE TO RELATED APPLICATIONS

This application claims the benefit of U.S. Provisional Patent Application No. 62/956,104, filed on Dec. 31, 2019, U.S. Provisional Patent Application No. 62/956,135, filed on Dec. 31, 2019, and U.S. Provisional Patent Application No. 62/956,138, filed on Dec. 31, 2019, each of which is incorporated by reference herein in their entirety for all purposes.

BACKGROUND

Mobile networks are comprised of a variety of components that, while operating on standard open communication interfaces, maintain proprietary (per vendor) databases of information and effectively form a closed system. External components, such as network optimizers, are unable to get a full view of real-time network conditions (e.g., throughput, user counts, etc.) and must rely on the limited information that is provided by those components. What limited information is provided is only done across long intervals (e.g., one-hour averages). Due to the highly volatile nature of mobile networks, one-hour averages may not provide adequate timely information upon which optimizers could take meaningful action.

Additionally, optimizers lack insight into what action to take within different geographies or shared channels (e.g., cells) because they don't have real-time condition information on the geographies or shared channels.

BRIEF SUMMARY OF THE DISCLOSURE

An objective of the disclosed embodiments is to generate crowd-sourced information about current conditions of a network in real time using network topology information that includes data session analytics from a one or more data sessions and an associated network location identifier (such as an identifier of a cell), where the network location identifier is determined by using IP address to network location mapping information to determine the network location of an endpoint of the one or more data sessions. The generated crowd-sourced information may include a real-time crowd-source profile for a cell in the network and real-time monitoring statistics for the network. The real-time crowd-source profile may be used to improve the improve the efficiency of the network; for example, the real-time crowd-source profile may be used to automatically adjust a congestion control algorithm to current network conditions. The real-time monitoring statistics may be used to identify the cell for increased scrutiny; for example, by automatically detecting that the cell has an increased probability of problematic behavior and in response increasing the monitoring of the cell.

In an embodiment, a method for generating network topology information comprises acquiring real-time information including a plurality of data session measurements and a plurality of network portion identifiers respectively associated with the data session measurements. Each data session measurement includes a measurement of a respective data session that was transmitted across a network, and each network portion identifier includes an identifier of a portion of the network corresponding to an endpoint of the respective data stream and determined by mapping an Internet Protocol (IP) address of the respective data stream to that network portion identifier using IP address to network portion identifier mappings. The method further comprises generating, in real time, network topology information for a network portion using the plurality of data session measurements and the plurality of respective network portion identifiers.

In embodiments of the method, acquiring the real-time information may comprise acquiring a first data session measurement of a first data session, receiving the IP address to network portion identifier mappings, determining a first IP address of the first data session, determining a first network portion identifier using the IP address to network portion identifier mappings and the first IP address, and associating the first network portion identifier with the first data session. The first IP address may be an IP address of a user device that is an endpoint of the first data session.

In embodiments of the method, acquiring the real-time information may be performed using a data plane agent of the network.

In embodiments of the method, the network portion may be a cell of the network, and the network topology information may include a crowd-sourced profile of the cell indicating one or more conditions in the cell. The crowd-sourced profile of the cell may include an average user throughput within the cell, a number of active users in the cell, a total data volume in the cell, a number of users connected but not actively transmitting, or combinations thereof.

In embodiments of the method, the network portion may be a cell, and the network topology information may include statistics regarding the cell, the statistics including a mean user throughput for the cell, a distribution of user throughputs for the cell, a number of active users in the cell, a number of connected users in the cell, a mean User Equipment (UE) throughput for the cell, a distribution of UE throughputs for the cell, a number of active UEs in the cell, a number of connected UEs in the cell, statistics regarding data volume for the cell, statistics regarding latency for the cell, or combinations thereof.

In embodiments of the method, the plurality of data session measurements may have been obtained by monitoring a user data plane of the network, and the IP address to network portion identifier mappings may have been obtained by monitoring user mobility and data session identifier information of a control plane of the network.

In embodiments of the method, the network portion identifier may be an Evolved Universal Mobile Telecommunication System Terrestrial Radio Access (E-UTRAN) Cell Identifier (ECI) or E-UTRAN Global Cell Identifier (EGCI).

In embodiments of the method, the data session measurements may include measurements of Transmission Control Protocol (TCP) data sessions.

Embodiments may also include a non-transitory computer readable medium having computer-executable instructions embodied thereon that when executed by at least one processor cause the processor to perform one or more of the methods described above.

Embodiments may also include a system including at least one processor and configured to perform one or more of the methods described above.

DETAILED DESCRIPTION

An embodiment relates to a mobility system that brings the pieces together to enable wireless network improvements and monitoring via the use of crowdsourced information to obtain the real time view of a network or cell condition. As used herein, the real time view refers to substantially instantaneous view of a network or cell condition, e.g., being no more than a ten-second delay of the actual network/cell condition. The substantially instantaneous view of the network/cell condition may have, for example, no more than 5 seconds, 2 seconds or 1 second delay according to implementation.

As used herein, a 'channel' may refer to a wireless communication channel, such as a cell of a wireless network. A cell may correspond to a carrier (that, an operating bandwidth, such as a bandwidth associated with a 600 MHz, 700 MHz, 850 MHz, 1700/2100 MHz, 1900 MHz, 2300 MHz, or other carrier frequency) of a sector of an eNodeB; for example, an eNodeB having three sectors and supporting 850 and 39,000 MHZ carriers in each sector would have six cells, each with a unique identifier. The unique identifier of the cell may be an Evolved Universal Mobile Telecommunication System (UMTS) Terrestrial Radio Access (E-UTRAN) Cell Identifier (ECI) or E-UTRAN Global Cell Identifier (EGCI).

U.S. patent application Ser. No. 16/363,749, titled COORDINATED DATA SHARING IN VIRTUALIZED NETWORKING ENVIRONMENTS, filed Mar. 25, 2019, and published as US Pub. No. 2019/0296991 A1, provides techniques for discovering the relations between an endpoint of a data session (as indicated by an IP address) and a location (e.g., a cell, as identified by an ECI or EGCI) of that endpoint within the network. As disclosed therein, messages on a control interface (such as an S1-MME interface of a 4G LTE wireless network) may be monitored to determine a mapping between IP addresses used in data sessions and an identifier (e.g., an ECI) indicating a portion of the wireless network, such as a cell. The mappings are stored in a mapping database, and updated as UEs move within the network and as data sessions are initiated and terminated. Data sessions may then be analyzed to determine data session analytics. The data session analytics may include data session throughput, size, latency, and IP addresses of the data session. The information in the mapping database may be used to add identifiers of a part of the wireless network (for example, ECIs identifying a cell) to the data session analytics. The ECI-tagged data session analytics may then be used as samples in embodiments of the present disclosure.

In an embodiment, IP to ECI mapping information is provided to a network data plane agent. The data plane agent collects detailed statistics on data sessions (e.g., throughput, data size, transmit times and durations, etc.). The data plane agent uses the IP:ECI mapping information to insert ECI into the statistics/metrics that it collects. Statistics can now be aggregated based on network topology (e.g., per ECI) and analyzed to extract patterns and trends from the crowd. This crowd sourced data is fed back into algorithms which apply the crowd information to improve optimization. It is also fed back to network monitoring system, which allows that system to detect changing network conditions for detailed monitoring.

Embodiments relate to a system that leverages data session IP to network location identifier (e.g., ECI) info, along with measured data session performance, to create a "crowd" of information for a given network topology. That information is then used for optimization and network monitoring purposes.

Mobile networks are comprised of a variety of components which are responsible for a variety functions such as sending/receiving user traffic to mobile devices over a wireless interface, delivering that traffic to/from the internet, controlling mobility of devices as they move throughout the network, and many others. Some of these components follow standard specifications (e.g., from the 3GPP standards body).

Figure 1:
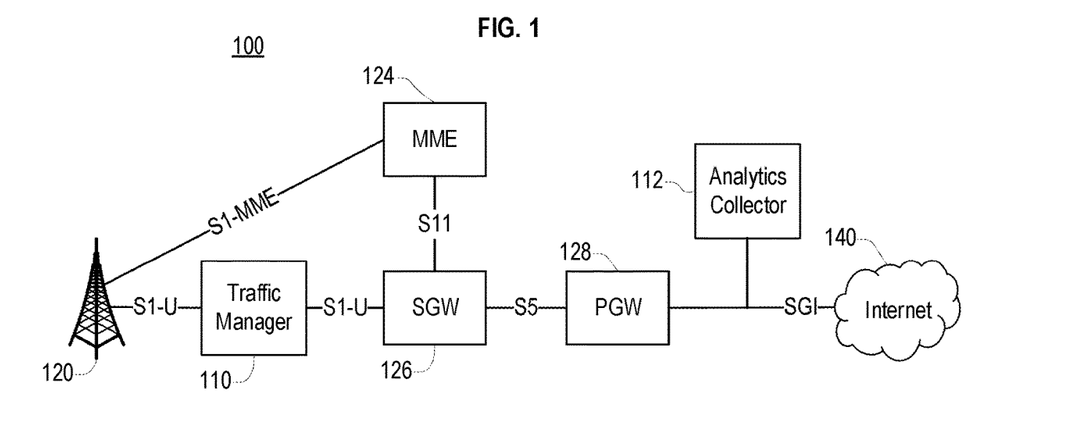
FIG. 1 illustrates a communication network according to an embodiment.

FIG. 1 illustrates a communication network 100 according to an embodiment that includes components according to a specification of the 3GPP standards body. Examples of these would be the mobile Serving Gateway (SGW) 126, Packet Gateway (PGW) 128, and Mobility Management Entity (MME) 124, among others. These components are used by the communication network 100 to provide communication (including voice and data communications) between User Equipment (UE) associated with an extended Node B (eNodeB) 120, other UEs associated with the eNodeB 120 or another eNodeB, and the internet 140. These components make up part of what is knowns as the Evolved Packet Core (EPC). These components can be implemented on custom hardware or they can also be implemented in a virtualized environment as virtual network functions (VNFs).

The standard components also send/receive information over standard interfaces. For example, FIG. 1 illustrates some but not all of the interfaces between some of the components. Some interfaces are for passing user data (e.g. S1-U and SGi), some are for network control signaling (e.g. S1-MME and S11) and some are for both (e.g. S5).

There can also exist many other non-standard components and applications in the mobile network that would operate on the same data interfaces, such as the Traffic Manager 110 and Analytics Collector 112 shown in FIG. 1.

User mobility control within a wireless network is an important function of the eNodeB 120, the MME 124, and the SGW 126. In 3GPP LTE networks, the eNodeB 120 exchanges information with the MME 124 regarding the movement of a UE and associated data sessions through the network (e.g., changes between different geographies, cells, radio access network types). Further, the MME 124 exchanges information with the SGW 126 regarding UE networking details (e.g., UE IP address, IMSI, phone number, quality of service parameters, and radio bearer rules).

Because the MME 124 receives UE or data session identification information, and also receives mobility updates for that session, the MME 124 contains UE location information for every data session. However, the MME 124 does not provide a common interface for sharing this information. Furthermore, some of the information is available to the MME 124 only via encrypted data fields.

This means there is not a standard way for non-MME components to learn where in a network (e.g., which cell site or divergent path) a data session is being transported. A specific LTE example would be that non-MME components do not know which cell (as identified by an E-UTRAN Cell Identifier (ECI)) a data session is being transported by. U.S. patent application Ser. No. 16/363,749, titled COORDINATED DATA SHARING IN VIRTUALIZED NETWORKING ENVIRONMENTS and published as US Pub. No. 2019/0296991 A1 describes a method for obtaining such information and producing a mapping of data session IP address to current UE location (E-UTRAN Cell Identifier or ECI).

For example, an embodiment may maintain on an S1 Application Protocol (S1AP) session table, a General Packet Radio Service (GPRS) Tunneling Protocol (GTP) session table, a session linking table that associates S1AP sessions with GTP sessions, and a location tracking table. The embodiment may maintain the tables by monitoring relevant S1AP and GTP messages, as described in US Pub. No. 2019/0296991 A1.

The session linking table may be used to map an Internet Protocol (IP) address of data packets being transmitted in a GTP session to an MME UE S1AP ID, an eNodeB UE S1AP ID, or both. The MME UE S1AP ID, an eNodeB UE S1AP ID, or both may be used with the location tracking table to determine an ECI.

In an embodiment, a data plane agent may then incorporate information regarding the data packets being transmitted in the GTP session into network measurements analytics for the location (such as a cell) identified by the ECI.

These analytics can be used to create a crowdsourced profile of a network cell which describes that cell at any second. The profile may include, for example, average UE throughput within the cell, number of active UEs in a cell, total data volume in a cell, UEs connected but not actively transmitting, and the like. This profile can be used for network optimization, such as for congestion window algorithm optimization.

These analytics can also be used to generate statistics that can be monitored at a network level. For example, by knowing which data session are in the same cell and by knowing which data sessions are currently transmitting data, embodiments can report a number of active UEs on a per second basis (or on a substantially instantaneous basis). This information is not otherwise available anywhere in the network on a per second basis. We can also report connected UEs, data volume, latency, etc. on a per second basis.

Figure 2:
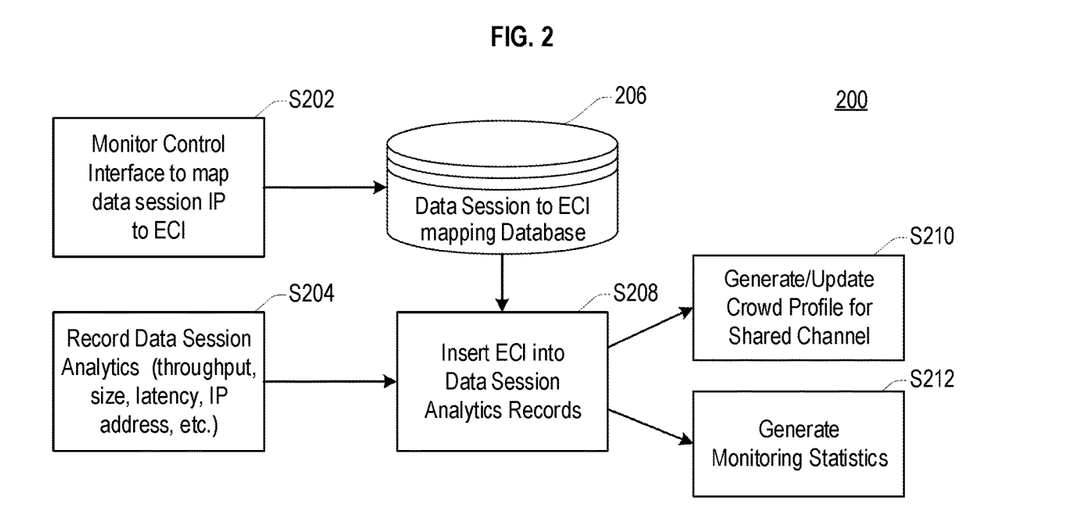
FIG. 2 illustrates a data flow according to an embodiment.

FIG. 2 illustrates a data flow 200 according to an embodiment. Details of embodiments of steps S202, S204, and S208 and database 206 are described in U.S. patent application Ser. No. 16/363,749, published as US Pub. No. 2019/0296991 A1, and accordingly a brief overview of each step is presented in this application in the interest of brevity.

Figure 3:
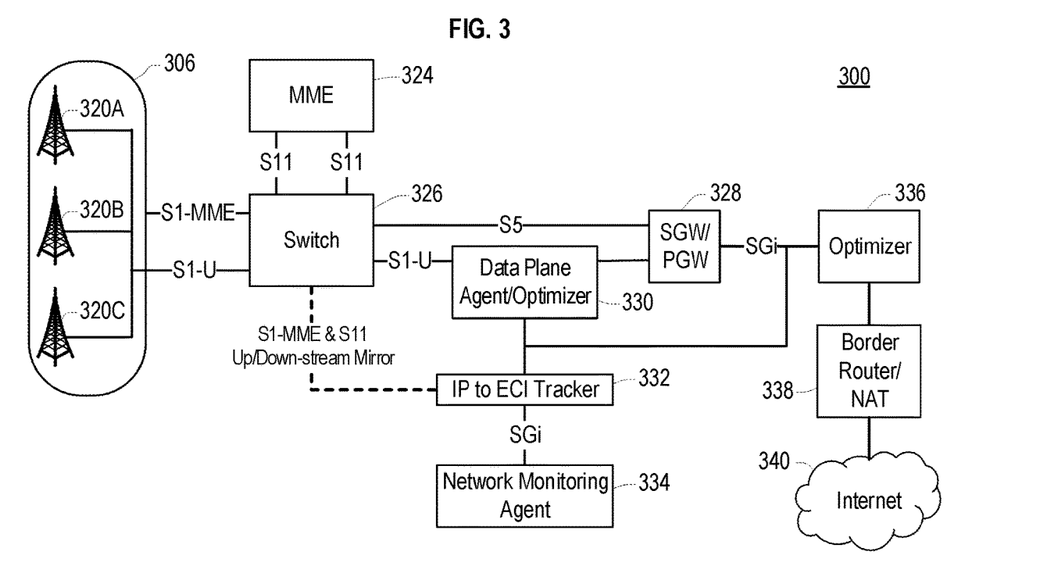
FIG. 3 illustrates a 4th Generation (4G) Long Term Evolution (LTE) wireless network, according to an embodiment.
Figure 4:
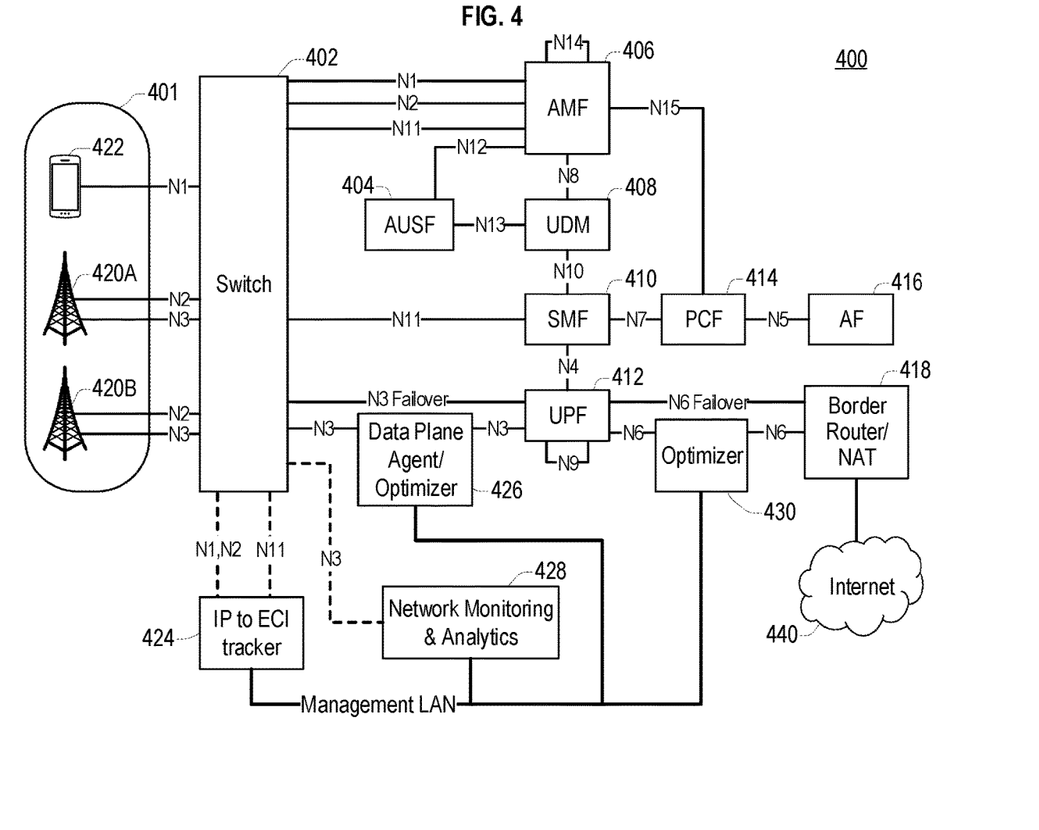
FIG. 4 illustrates a 5th Generation (5G) wireless network, according to an embodiment.

At S202, messages on a control interface (such as an S1-MME interface of a 4G LTE wireless network such as shown in FIG. 3 or an N2 and/or N11 interface of a 5G wireless network such as shown in FIG. 4) are monitored in order to determine a mapping between IP addresses used in data sessions and an identifier indicating a portion of the wireless network (such as an ECI indicating a cell). The mappings are stored in a mapping database such as the data session to ECI mapping database 206, and updated as a UE moves within the network and as data sessions are initiated and terminated.

At S204, data sessions are analyzed to determine data session analytics. The data session analytics may include data session throughput, size, latency, and IP addresses of the data session. The data session analysis may be performed by analyzing messages from, for example, and S1-U interface of a 4G LTE wireless network or an N3 interface of a 5G wireless network.

At S208, the information in the data session to ECI mapping database 206 is used to add identifiers of a part of the wireless network (for example, ECIs that identify a cell) to the data session analytics produced in S204. The ECI-tagged data session analytics are then used in S210 and S212.

At S210, the ECI-tagged data session analytics are used to create a crowd-sourced profile for a shared channel (such as a cell). In an embodiment, the crowd-sourced profile is created using the process shown in FIG. 5, as described below. The crowd sourced profile may include an average UE throughput within the cell, a number of active UEs in the cell, a total data volume in the cell, a number of UEs connected but not actively transmitting, and the like.

At S212, respective monitoring statistics are generated for parts (such as cells) of the wireless network. In an embodiment, the respective monitoring statistics are created using the process shown in FIG. 6, as described below. Examples of monitoring statistics include a number of connected UEs, a number of active UEs (that is, UEs currently sending and/or receiving data, as distinct from connected but idle UEs), data volume, latency statistics, and the like.

In an embodiment, a data plane agent/optimizer (such as identified by reference character 330 in FIG. 3 and be reference character 426 in FIG. 4) may use the monitoring statistics to optimize the performance of the wireless network. For example, the data plane agent/optimizer may adapt a congestion management protocol according to a profile generated at S210, monitoring statistics generated at S212, or both.

FIG. 3 illustrates a 4th Generation (4G) Long Term Evolution (LTE) wireless network 300 (hereinafter, the 4G network 300) according to an embodiment.

The 4G network 300 includes at least one Radio Access Network 306 including one or more extended Node Bs (eNodeBs), here shown as first, second, and third eNodeBs 320A, 320B, and 320C. The RAN 306 communicates control information with a switch 326 using an S1-MME interface using a S1-AP protocol, while the eNodeBs 320A, 320B, and 320C communicate user plane data with the switch 326 using an S1-U interface using a GTP-U protocol.

The switch 326 exchanges control information with a Mobility Management Engine 324 over one or more control plane interfaces S11 using the GPRS Tunneling Protocol for control plane (GTP-C). The switch 326 also communicates with a data plane agent/optimizer 330 using an S1-U interface and with a Serving Gateway/Packet Gateway (SGW/PGW) 328 using an S5 interface. The S5 interface provides user plane tunneling and tunnel management functions and enables serving gateway to connect to multiple packet data network (PDN) gateways for providing different IP services to a UE operating in the RAN 306, and uses GTP-U to exchange user data.

The switch 326 also provides an IP to ECI tracker 332 with mirrored information from the S1-MME interface between the RAN 306 and the switch 326 and from the S11 interfaces between the MME 324 and the switch 326.

The SGW/PGW 328, the data plane agent/optimizer 330, the IP to ECI tracker 332, and an optimizer 336 exchange information through SGi interfaces using an Internet Protocol (IP). The IP to ECI tracker 332 may also communicate with a network monitoring agent 334 using an SGi interface.

The optimizer 336 sends and receives packets to the internet 340 through a border router/Network Address Translation (NAT) engine 338.

The IP to ECI tracker 332 monitors upstream and downstream information from the switch 326 to determine and maintain relationships between IP addresses and ECIs.

The Network Monitoring Agent 330 may perform step S210, step S212, or both of process 200 of FIG. 2, and may provide the results from one or both of those steps to the data plane agent/optimizer 330, the optimizer 336, or both.

Each of the MME 324, the switch 326, the SGW/PGW 328, the data plane agent/optimizer 330, the IP to ECI tracker 332, the network monitoring agent 334, the optimizer 336, and the border router/NAT device 338 may be implemented using specialized hardware, software running on a respective or shared computing device having the appropriate interfaces, or combinations thereof.

FIG. 4 illustrates a 5$^{th}$ Generation (5G) wireless network 400 (hereinafter, the 5G network 400) according to an embodiment.

The 5G network 400 includes an Authentication Server Function (AUSF) 404, an Access and Mobility Management Function (AMF) 406, Unified Data Management (UDM) 408, a Session Management Function (SMF) 410, a User Plane Function (UPF) 412, a Policy Control Function (PCF) 414, and an Application Function (AF) 416. The 5G network 400 may also include a border router/NAT device 418, an IP to ECI tracker 424, a data plane agent/optimizer 426, a Network Monitoring & Analytics function 428, and an optimizer 430. The border router/NAT device 418 couples the 5G network 400 to a Wide Area Lan (WAN) such as the internet 440.

A RAN 401 comprises a UE 422, a first eNodeB 420A, and a second eNodeB 420B. The UE 422 communicates with the AMF 406 using a Non-Access Stratum (NAS) interface N1 interface routed through a switch 402. Each of the first and second eNodeB 420A and 420B communicates with the AMF 406 using a RAN control plane (CP) interface N2 routed through the switch 402 and with the UPF 412 using an N3 interface routed through the switch 402.

The AMF 406 may provide termination of the RAN CP interface N2, termination of the NAS interface N1, NAS ciphering and integrity protection, registration management, connection management, reachability management, mobility management, transport and proxy services for SM messages between the UE 422 and the SMF 410, Access Authorization, Security Anchor Functionality (SEAF), location services management, UE mobility event notification, and other functions.

The UPF 412 provides an anchor point for Intra-/Inter-RAT mobility, an External PDU Session point of interconnect to data network, packet routing & forwarding, packet inspection, a UP part of policy rule enforcement, traffic usage reporting, Quality of Service (QoS) handling for user plane, reflective QoS marking in DL, uplink traffic verification, transport level packet marking in the uplink and downlink, downlink packet buffering and downlink data notification triggering, and other functions. The UPF 412 communicates with the eNodeBs 420A and 420B over an N3 interface. The N3 interface may use the GPRS Tunneling Protocol (GTP) with header extensions for 5G, use segment routing (IPv6 SRv6 or Network Server Heading (NSH)), or use an Information Centric Networking (ICN) protocol. The UPF 412 may communicate with another UPF via an N9 interface.

The SMF 410 provides session management, UE IP address allocation and management; selection and control of UP function, traffic steering configuration at the UPF to route traffic to proper destination, control part of policy enforcement and QoS, and downlink data notification. The SMF 410 may communicate with the UDM 410 using an N10 interface, communicate with the AMF 406 through the switch 402 using an N11 interface, communicate with the PCF 414 using an N7 interface, and communicate with the UPF 412 using an N4 interface.

The PCF 414 supports a unified policy framework to govern network behavior, provides policy rules to Control Plane function(s) to enforce them. and accesses subscription information relevant for policy decisions stored in a Unified Data Repository (UDR).

The UDM 408 provides generation of 3GPP Authenticate Key Exchange (AKA) authentication credentials, user identification handling, access authorization based on subscription data (e.g. roaming restrictions), UE's serving NF Registration management, support to service/session continuity, MT-SMS delivery support, Subscription management, and SMS management.

The AUSF 404 provides Authentication Server Function (AUSF) as specified by the 3GPP Service and Systems Aspects (SA) Working Group 3 (WG3) on security and privacy.

The AF 416 provides application influence on traffic routing, accessing network exposure function, and interacts with the policy framework for policy control.

The Network Monitoring & Analytics function 428 may perform step S210, step S212, or both of process 200 of FIG. 2, and may provide the results from one or both of those steps to the data plane agent/optimizer 426, the optimizer 430, or both.

Each of the AUSF 404, the AMF 406, the UDM 408, the SMF 410, the UPF 412, the PCF 414, the AF 416, the border router/NAT device 418, the IP to ECI tracker 424, the data plane agent/optimizer 426, the Network Monitoring & Analytics function 428, and the optimizer 430 may be implemented using specialized hardware, software running on a respective or shared computing device having the appropriate interfaces, or combinations thereof.

In an embodiment, the switch 402 provides the IP to ECI tracker 424 with mirrored information from the N1 interface between the UE 422 and the AMF 406, from the N2 interface between the eNodeBs 420A and 420B and the AMF 406, and from the N11 interface between the AMF 406 and the SMF 410. The switch 402 also provides mirrored data to Network Monitoring & Analytics function 428, the mirrored data being from the N3 interface between the eNodeBs 420A and 420B and data plane optimizer/agent 426 and/or the UPF 412.

In the interest of brevity and clarity, descriptions of some interfaces and interactions within the 5G network 400 that are not needed to disclose embodiments of the present disclosure and/or are well known in the art are not described.

In an embodiment, the system incorporates user mobility, user session ID, and data session performance (from possibly different system components) information into one or more data models which can then be leveraged for optimization or monitoring of a mobile wireless network. The data models may be associated with respective parts of the mobile wireless network, such as respective cells. The data models may provide metrics on a per second basis for each cell (herein after referred to as "network topology information") such as, for example, active users (or UEs) and average user (or UE) throughput, although embodiments are not limited thereto.

The network topology information may be used to improve the network efficiency. For example, it may be used to enable network optimizations based on crowd sourced data. In embodiments, any optimization system that monitors and/or controls user data sessions (such as the data plane optimizer/agent 330 of the 4G network 300 of FIG. 3 or the data plane optimizer/agent 426 of the 5G network 400 of FIG. 4) can also know which user data sessions are coincident on the same cell. The coincident data sessions act as the crowd from which information can be extracted to be applied to the optimization of that cell.

The network topology information also may be used to report real-time network performance to a monitor (such as the network monitoring agent 334 of the 4G network 300 of FIG. 3 or the network monitoring and analytics function 428 of the 5G network 400 of FIG. 4) for network study and for identifying problem spots in the network.

Figure 5:
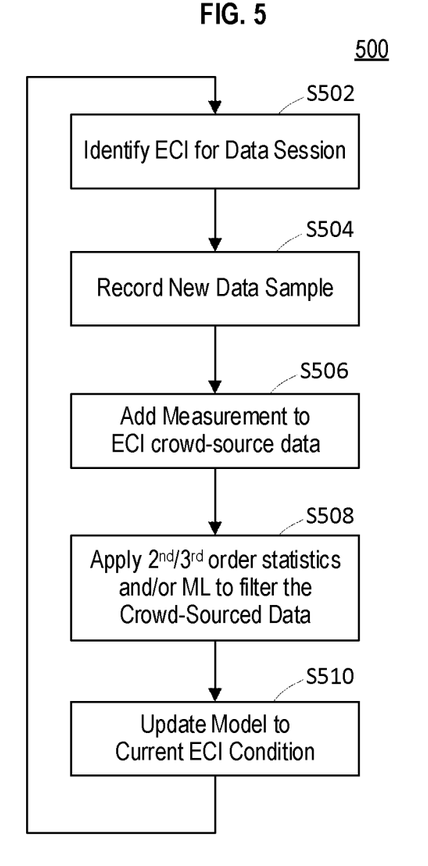
FIG. 5 illustrates a process of generating and/or updating a crowd-sourced profile for a shared channel, according to an embodiment.

FIG. 5 illustrates a process 500 of generating and/or updating a crowd-sourced profile for a shared channel, according to an embodiment. The process 500 may be performed by a networking monitoring agent (such as, for example, network monitoring agent 334 of FIG. 3 or networking monitoring and analytics function 428 of FIG. 4) and may produce information used by automatic network optimizers (such as, for example, Data Plane Agent/Optimizer 330 and/or Optimizer 336 of FIG. 3, or Data Plane Agent/Optimizer function 426 and/or Optimizer 430 of FIG. 4), but embodiments are not limited thereto.

The process 500 may be performed in real time using information on the network provided in real time at a fine temporal granularity (e.g., every second) but embodiments are not limited thereto.

At S502, the process 500 determines a network location indicator (here, an ECI) associated with a data session. The network location may be a cell of a RAN with which an endpoint of the data session is associated. The endpoint may be a destination of the data session.

The network location indicator may be determined from data session analytics that have been tagged with the ECI, as described with respect to FIG. 2. The tagged data session analytics may be derived from measurements of the data session and from control information of the network, as described with respect to FIG. 2.

At S504, the process 500 records a new data sample corresponding to a measurement from the data session. The sample may include measurements related to channel conditions of the cell identified by the ECI.

At S506, the process 500 adds the new sample to a collection of samples for the ECI, herein referred to as crowd-sourced data. The collection of samples may include samples from other data sessions being transported through the cell.

At S508, the process 500 may apply second order statistics (such as variance), third order statistics (such as skewness), machine learning, and the like to filter the crowd-sourced data. The filtering may operate to eliminate data that has a high probability of not being representative of the current state of the cell. For example, at S508 the process 500 may filter out samples recognized by a trained neural network as outliers, samples that are outside the centroid of a two-dimensional dataset, samples that are outside a central 95% of a deviation, or combinations thereof, but embodiments are not limited thereto.

After filtering the crowd-sourced data, at S508 the process 500 may generate statistical properties (e.g., a mean, variance, and so on) of the samples that were not filtered out.

At S510, the process 500 updates an estimation model for the ECI using the results of S508. The estimation model may include a channel congestion profile for the cell indicated by the ECI. The estimation model may include, for example, average user throughput within a cell, number of active users in a cell, total data volume in a cell, users connected but not actively transmitting, or combinations thereof, but embodiments are not limited thereto.

Figure 6:
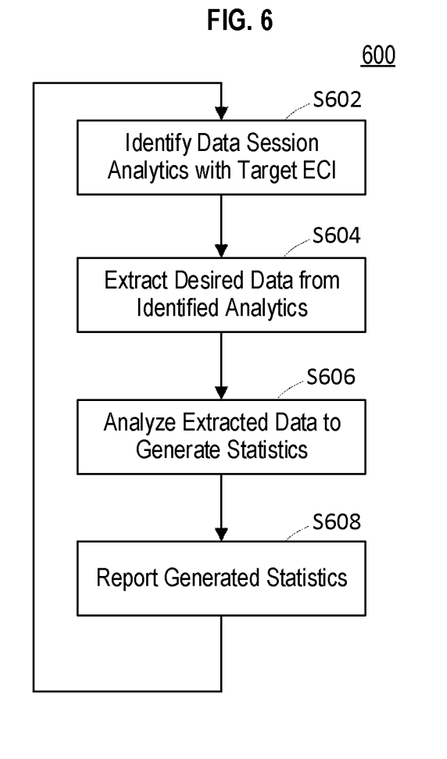
FIG. 6 illustrates a process for generating and/or updating monitoring statistics, according to an embodiment.

FIG. 6 illustrates a process 600 for generating monitoring statistics, according to an embodiment. The process 600 may be performed by a networking monitoring agent (such as, for example, network monitoring agent 334 of FIG. 3 or networking monitoring and analytics function 428 of FIG. 4) and may be used for automatic detection of potentially problematic network locations and conditions (such as overloaded or degraded cells), but embodiments are not limited thereto.

The process 600 may be respectively performed for all relevant portions of the network (for example, for all cell in the network) or for a designated subset of relevant portions of the network (for example, cells with a history of performance problems) bur embodiments are not limited thereto. The process 600 may be performed in real time using information on the network provided in real time at a fine temporal granularity (e.g., every one second) but embodiments are not limited thereto.

At S602, the process 600 identifies analytics of a data session (such as measurements from the data session or statistics derived from such measurements) that have been tagged with the identifier (in this example, an ECI) of a target portion of a network (in this example, a cell).

At S604, the process 600 extracts desired data from the data session analytics identified in S602. The desired data from the data session may be determined by filtering the data session analytics. The filtering may apply statistical functions, machine learning, or combinations thereof to filter the data session analytics, but embodiments are not limited thereto. The filtering may operate to eliminate data that has a high probability of not being representative of the current state of the cell. For example, the filtering may filter out samples recognized by a trained neural network as outliers, samples that are outside the centroid of a two-dimensional dataset, samples that are outside a central 95% of a deviation, or combinations thereof, but embodiments are not limited thereto.

At S606, the process 600 analyzes the extracted data produced at S604. Analyzing the extracted data may include generating first order statistics (such as a mean), second order statistics (such as a variance), third order statistics (such as a skewness), or combinations thereof of the extract data. For example, at S606 the process 600 may generate a mean user (or UE) throughput for a cell, a distribution of user/UE throughputs for a cell, a number of active users or UEs, a number of connected users or UEs, statistics regarding data volume for the cell, statistics regarding latency for the cell, and the like.

At S608, the process 600 provides the results of the analysis performed at S606, the data extracted at S604, or both to a network monitoring process. The process 600 may provide this information to the network monitoring process in real time at a fine temporal granularity (for example, at one second intervals).

The network monitoring system may use the result to perform identification of a performance issue in the cell, predict a performance issue in cell, determine a cause of performance issue in the cell, optimize communication in the cell, determine a level of monitoring of the cell, identification of an opportunity for future network resource use optimization, and the like, or combinations thereof, but embodiments are not limited thereto.

Figure 7:
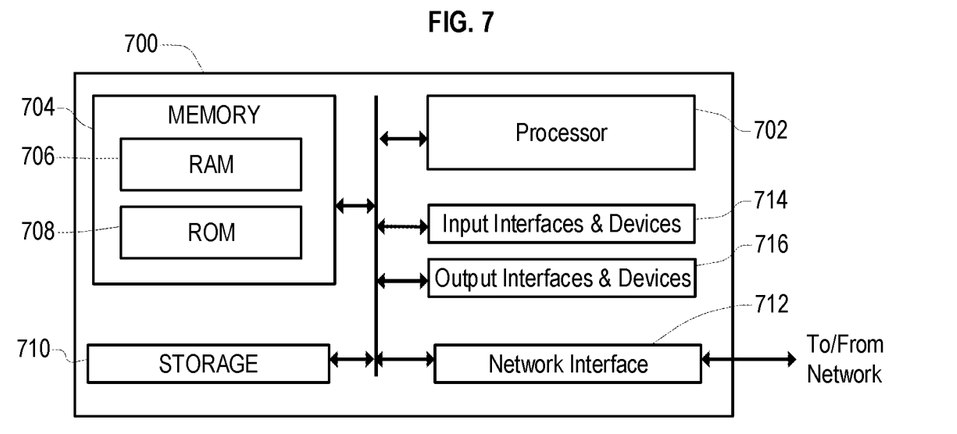
FIG. 7 illustrates a computing system that may be used to implement an embodiment.

FIG. 7 illustrates a computer system 700, which may be used to implement an embodiment. The computer system 700 may implement an embodiment by, for example, executing computer programming instructions stored in a non-transitory computer readable medium.

The computer system 700 may include one or more of a processor 702, a memory 704, input interfaces and devices 714, output interfaces and devices 716, and a storage 710, each of which communicates with each other through a bus, fabric, or other interconnect technology. The computer system 700 may also include one or more network interfaces 712 coupled to a network. For example, when the computer system 700 is used to implement a router or gateway, the computer system 700 may include a network interface 712 for each physical layer network connection of the computer system 700.

The processor 702 may be a central processing unit (CPU) or a semiconductor device that executes processing instructions stored in the memory 704 and/or the storage 710. The memory 704 and the storage 710 may include various forms of volatile or non-volatile storage media. For example, the memory 704 may include a read-only memory (ROM) 708 and a random access memory (RAM) 706, and the storage may include a Hard Disk Drive (HDD), a Solid State Drive (SSD), or the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method for generating network topology information, the method comprising:
    acquiring real-time information including a plurality of data session measurements and a plurality of network portion identifiers respectively associated with the data session measurements, wherein:
       each data session measurement includes a measurement of a respective data session that was transmitted across a network, and
       each network portion identifier includes an identifier of a portion of the network corresponding to an endpoint of the respective data stream and determined by mapping an Internet Protocol (IP) address of the respective data stream to that network portion identifier using IP address to network portion identifier mappings; and
    generating, in real time, network topology information for a network portion using the plurality of data session measurements and the plurality of respective network portion identifiers.

2. The method of claim 1, wherein acquiring the real-time information comprises:
    acquiring a first data session measurement of a first data session;
    receiving the IP address to network portion identifier mappings;
    determining a first IP address of the first data session;
    determining a first network portion identifier using the IP address to network portion identifier mappings and the first IP address; and
    associating the first network portion identifier with the first data session.

3. The method of claim 2, wherein the first IP address is an IP address of a user device that is an endpoint of the first data session.

4. The method of claim 1, wherein acquiring the real-time information is performed using a data plane agent of the network.

5. The method of claim 1,
    wherein the network portion is a cell of the network, and
    wherein the network topology information includes a crowd-sourced profile of the cell indicating one or more conditions in the cell.

6. The method of claim 5,
    wherein the crowd-sourced profile of the cell includes an average user throughput within the cell, a number of active users in the cell, a total data volume in the cell, a number of users connected but not actively transmitting, or combinations thereof.

7. The method of claim 1,
    wherein the network portion is a cell, and
    wherein the network topology information includes statistics regarding the cell, the statistics including a mean user throughput for the cell, a distribution of user throughputs for the cell, a number of active users in the cell, a number of connected users in the cell, a mean User Equipment (UE) throughput for the cell, a distribution of UE throughputs for the cell, a number of active UEs in the cell, a number of connected UEs in the cell, statistics regarding data volume for the cell, statistics regarding latency for the cell, or combinations thereof.

8. The method of claim 1,
    wherein the plurality of data session measurements were obtained by monitoring a user data plane of the network, and
    wherein the IP address to network portion identifier mappings were obtained by monitoring user mobility and data session identifier information of a control plane of the network.

9. The method of claim 1, wherein the network portion identifier is an Evolved Universal Mobile Telecommunication System Terrestrial Radio Access (E-UTRAN) Cell Identifier (ECI) or E-UTRAN Global Cell Identifier (EGCI).

10. The method of claim 1, wherein the data session measurements include measurements of Transmission Control Protocol (TCP) data sessions.

11. A non-transitory computer readable medium having computer-executable instructions embodied thereon that when executed by at least one processor cause the processor to perform a method for generating network topology information, the method comprising:
    acquiring real-time information including a plurality of data session measurements and a plurality of network portion identifiers respectively associated with the data session measurements, wherein:
       each data session measurement includes a measurement of a respective data session that was transmitted across a network, and
       each network portion identifier includes an identifier of a portion of the network corresponding to an endpoint of the respective data stream and determined by mapping an Internet Protocol (IP) address of the respective data stream to that network portion identifier using IP address to network portion identifier mappings; and generating, in real time, network topology information for a network portion using the plurality of data session measurements and the plurality of respective network portion identifiers.

12. The non-transitory computer readable medium of claim 11, wherein acquiring the real-time information comprises:
acquiring a first data session measurement of a first data session;
receiving the IP address to network portion identifier mappings;
determining a first IP address of the first data session;
determining a first network portion identifier using the IP address to network portion identifier mappings and the first IP address; and
associating the first network portion identifier with the first data session.

13. The non-transitory computer readable medium of claim 12, wherein the first IP address is an IP address of a user device that is an endpoint of the first data session.

14. The non-transitory computer readable medium of claim 11, wherein acquiring the real-time information is performed using a data plane agent of the network.

15. The non-transitory computer readable medium of claim 11,
wherein the network portion is a cell of the network, and
wherein the network topology information includes a crowd-sourced profile of the cell indicating one or more conditions in the cell.

16. The non-transitory computer readable medium of claim 15,
wherein the crowd-sourced profile of the cell includes an average user throughput within the cell, a number of active users in the cell, a total data volume in the cell, a number of users connected but not actively transmitting, or combinations thereof.

17. The non-transitory computer readable medium of claim 11,
wherein the network portion is a cell, and
wherein the network topology information includes statistics regarding the cell, the statistics including a mean user throughput for the cell, a distribution of user throughputs for the cell, a number of active users in the cell, a number of connected users in the cell, a mean User Equipment (UE) throughput for the cell, a distribution of UE throughputs for the cell, a number of active UEs in the cell, a number of connected UEs in the cell, statistics regarding data volume for the cell, statistics regarding latency for the cell, or combinations thereof.

18. The non-transitory computer readable medium of claim 11,
wherein the plurality of data session measurements were obtained by monitoring a user data plane of the network, and
wherein the IP address to network portion identifier mappings were obtained by monitoring user mobility and data session identifier information of a control plane of the network.

19. The non-transitory computer readable medium of claim 11, wherein the network portion identifier is an Evolved Universal Mobile Telecommunication System Terrestrial Radio Access (E-UTRAN) Cell Identifier (ECI) or E-UTRAN Global Cell Identifier (EGCI).

20. The non-transitory computer readable medium of claim 11, wherein the data session measurements include measurements of Transmission Control Protocol (TCP) data sessions.

* * * * *